United States Patent [19]

Vogelenzang

[11] 4,037,390
[45] July 26, 1977

[54] DEVICE FOR SIDE DELIVERY OF CROP, GRASS OR GRAIN

[76] Inventor: Alexander Jan Vogelenzang, Wageningsestraat 28, Andelst, Netherlands

[21] Appl. No.: 665,615

[22] Filed: Mar. 10, 1976

[30] Foreign Application Priority Data

Mar. 19, 1975 Netherlands .......................... 7503295

[51] Int. Cl.² .......................................... A01D 57/20
[52] U.S. Cl. ...................................... 56/14.5; 56/192; 198/300
[58] Field of Search ................ 56/14.5, 192, DIG. 21; 198/300, 520, 510

[56] References Cited

U.S. PATENT DOCUMENTS

| 1,269,987 | 6/1918 | Werden | 198/300 X |
| 3,402,534 | 9/1968 | Phillips | 56/14.5 X |
| 3,665,686 | 5/1972 | Duncan | 56/14.5 X |
| 3,696,598 | 10/1972 | Weichel | 56/192 X |

*Primary Examiner*—Jay N. Eskovitz
*Attorney, Agent, or Firm*—James E. Nilles

[57] ABSTRACT

A device for side delivery of crop, grass or grain by means of one or more transverse conveyor belts arranged behind the implement across the full width thereof in a roughly vertical plane enabling lateral delivering material, such as crop, to windrows or swaths on the ground where it can be slightly gathered.

15 Claims, 8 Drawing Figures

DEVICE FOR SIDE DELIVERY OF CROP, GRASS OR GRAIN

BACKGROUND OF THE INVENTION

1. Field of the Invention

The invention relates to a device for side delivery of crops, grass or grain that is adapted for use with flail type harvesters, reel mowers, rotary mowers set at an angle towards the front, rotary tedders and reel tedders. All these machines raise the picked-up crop, grain or grass from the ground and throw it in an arc to the rear.

2. Description of the Prior Art

The arrangement of one or more transverse conveyor belts which are arranged behind the implements across the full width in a substantially vertical plane are known from German Patent Specifications No. 203,972, No. 416,981 and No. 652,455 for mowing machinery. These devices are designed to convey the grain to one side directly after cutting, to turn it over at the same time and deposit it, as required, in a swath. In order to be able to pick up the grain which is still upright after cutting, the transverse conveyor belts are arranged directly behind the cutter or table connected thereto. The cut grain is in contact with the ground here.

From U.S. Pat. No. 3,343,347 it is known to use transverse conveyor means arranged behind a cutting mechanism in a windrower type harvester. The conveyor means of this structure are arranged in such a manner that the cut crop is directed over the leading edge to the laterally shiftable conveyor means which run in a horizontal plane.

The introduction of the combine harvester in the field of agricultural engineering has made this type of side depositing more or less superfluous. The swath boards or baskets used nowadays only exert a limited effect on directional depositing of the grain which is freshly cut or already lying on the ground because they always work behind the machine.

Accordingly, hay-making after cutting of the grain is always carried out by means of two machines under present standards. One type of machine is designed to scatter the swath; the second type of machine serves to collect the scattered grain and to form a swath. The first type incorporates fork tedders, reel tedders and rotary tedders. All these machines work such that their rotating implements (fingers) lift the freshly mown or already part-dried grain off the ground and throw through the air with a more or less salient throw component, the grain being opened up and falling loosely to the ground, fanned out to a fairly wide degree. Collecting to form a swath overnight or after sufficient drying for loading onto a wagon or feeding a press is carried out almost always by means of a finger-wheel rake, a machine having several finger wheels which are arranged in staggered fashion behind one another and partly intersect in the direction of travel. Said finger wheels shift aside the grain lying on the ground in such a manner that the grain picked up by the foremost finger wheel is conveyed to the next wheel and from there to the one behind, the grain finally being deposited in the form of a swath behind the rearmost and last finger wheel. The finger wheels of this machine are either driven positively by the power take-off of the tractor towing them or are caused to rotate as they are pulled across the ground.

One disadvantage of finger-wheel rakes is that the fingers attached to the wheels have to come close to the ground or even project into it, meaning that they damage the turf as they move across the field; they get bent or even break off as they strike objects on the ground and tear out particles of earth as they shift the grain aside. Moreover, side delivery rakes of this kind require a great deal of room and are relatively heavy, the finger wheels running very erratically and often jumping, especially when they are driven at high speed as they are pulled across the ground.

Summary of the Invention

It is the object of this invention to remedy these disadvantages. The object is to design the side rake required for gathering swaths in the form of an attachment for tedders of the type always found on farms, which attachment can be made lighter, used for a wider variety of applications and picks up the grain in the air and shifts it aside at a certain distance from the ground and hence largely free from particles of earth.

According to the invention this object is achieved in that the transverse conveyor belt or belts is/are arranged within the tossing region of the implements, which pick up the cut grain off the ground and throw it to the rear, and can be driven at speeds producing a pick-up effect until reaching one of the tow end pulleys.

Due to the fact that the transverse conveyor belts are arranged within the tossing region of the implements, i.e., at a predetermined distance from the implements, the grain tossed up to the rear by the implements acting as tedders is thrown against the carrying side or front run of the transverse conveyor belt, to which it sticks until it reaches the belt end pulley where it drops off as the belt starts to return, then lying on the ground in the form of a swath for example.

The transverse conveyor belt can be used whereever the implements of mower or hay-making machine are caused to turn quickly and operate in such a manner that they lift the grain up directly after cutting, or directly off the ground by means of the current of air for example, throwing the grain either directly afterwards or simultaneously to the rear; the grain travels through a particular trajectory at the peak of which you arrange the transverse conveyor belts.

Typical agricultural machines suitable for this purpose comprise flail mowers, reel mowers, rotary mowers set at an angle toward the front, rotary tedders and reel tedders. All these machines raise the pick-up grains and trow it in an arc to the rear. The flail mower raises the cut grain between a covering hood and a reel. On reaching the end of the covering hood, the picked-up grain has such kinetic energy that it has a horizontal throw component.

On striking the transverse conveyor belt, the parts of greater specific gravity such as lumps of soil, stones and sand drop back onto the ground immediately whereas the grain of lower specific gravity is picked up by the moving belt as a result of the high throwing speed and the steady flow of grain from the front.

An essential factor is that the transverse conveyor belt is driven at a speed producing a pick-up effect at the delivery end, meaning that directional depositing in the form of a swath for example is possible without damp grain in particular sticking to the return side or back run of the belt.

It is particularly beneficial when a quickly moving transverse conveyor belt is used in conjunction with the mowing of overgrown slopes or sweeping of mown slope surfaces. When a conventional slope-type mower is being used, the cut grass is left behind the cutter and has to be swept away afterwards. In this case there is a risk that some of the cut grass will slip into the adjacent ditch and block it. Moreover, sweeping the cut grass with customary sweepers is detrimental to grass growth and turf formation, which is of great importance for the stability of slope surfaces.

In order to back up upward delivery in conjunction with the mowing of slopes and the simultaneous conveying of the cut grass over the top edge of the slope to the level ground beyond, the adhesive capacity of the belt can be raised by roughening, especially by outward projecting fingers or vertically arranged ribs, ridges or tabs.

In an expedient configuration of the invention the transverse conveyor belt may be combined with a flail mower or rotary mower, although it may also be designed as a trailer, extending transversely to a longitudinal member and supported by its own wheels.

When designed as an attachment, a transverse conveyor belt of this kind may also be used in conjunction with a brush turning about a horizontal axis on road sweepers or snow blowers.

The plane in which the belt moves as well as its speed of movement are variable. Although the grass or grain thrown at the belt stick to it when the latter is moving at the right speed, and is carried along to the end pulley when the belt is arranged vertically, the adhesive capacity can be increased by making the belt move in a plane which is slightly off vertical at the top in the rearward direction. An increase in the speed of the belt also enables – especially if the belt has projecting fingers or ribs – the grass or grain to be thrown further away and scattered out by the throwing action of the fingers or ribs at the point of turn-around of the belt, instead of the grain being gathered into a swath. The resultant range of scatter can be made even greater when the side conveyor belt consists of several parts, i.e. when several conveyor belts are arranged above one another and can be driven by end pulleys of different diameters, meaning that the grass or grain is ejected by each of the transverse conveyor belts with throw components of differing magnitude.

Instead of one conveyor belt, it is also possible to use a row of plumb wheels are reels furnished with fingers.

DESCRIPTION OF THE DRAWINGS

Other objects and advantages of the invention will become apparent from the following description and from the Figures of the drawings in which.

DETAILED DESCRIPTION OF THE DRAWINGS

Figure 1:
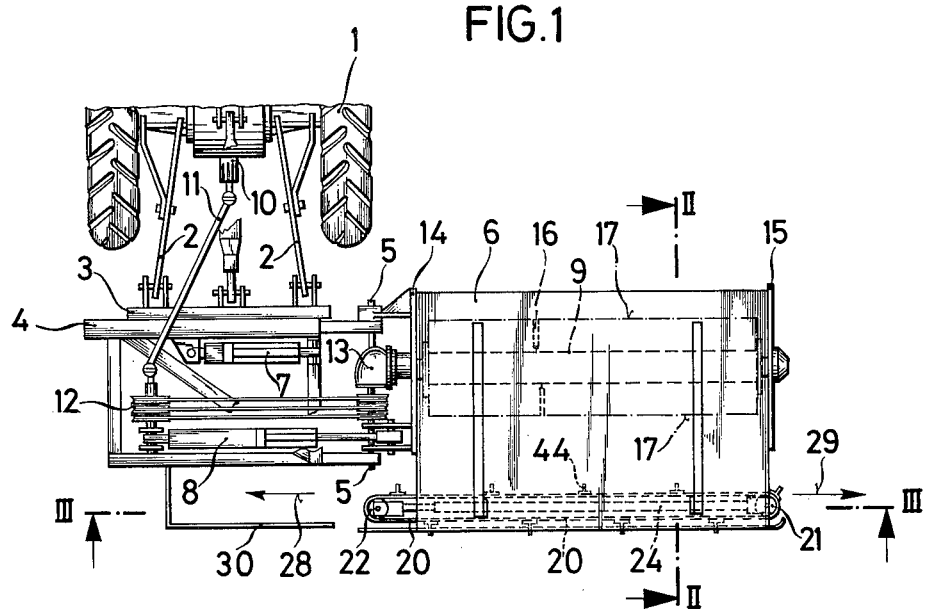
FIG. 1 is a top view of a flail mower and transverse conveyor belt situated behind it, which mower is saddle-mounted and attached pivotably to one side of the tractor track.

FIG. 1 shows the rear part of a tractor 1 with a three-point linkage 2 and with a support 3. A frame 4 is secured to the rear side of the support 3 suitable for sliding lateral displacement by means of a hydraulic cylinder 7 supported against the support 3.

The frame 4 carries at its right side two pivot pins 5 in horizontal tandem arrangement in travel direction for a pivotal connection of a flail type harvester 6. This flail type harvester 6 can be raised or lowered towards the ground by means of a further hydraulic cylinder 8.

The flail shaft or rotor 9 of the flail type harvester carries pivotally connected knives 16 at its periphery and is driven by the P.T.O 1o of the tractor through a cardan shaft 11, a belt drive 12 and an universal joint 13. Both ends of the flail shaft or rotor 9 are adjustably mounted in bearings at the left and right sidewall 14, 15 respectively of the flail type harvester, whereas the left shaft end in travel direction is coupled to the driven end of the universal joint 13 which is secured to the left sidewall 14.

Figure 2:
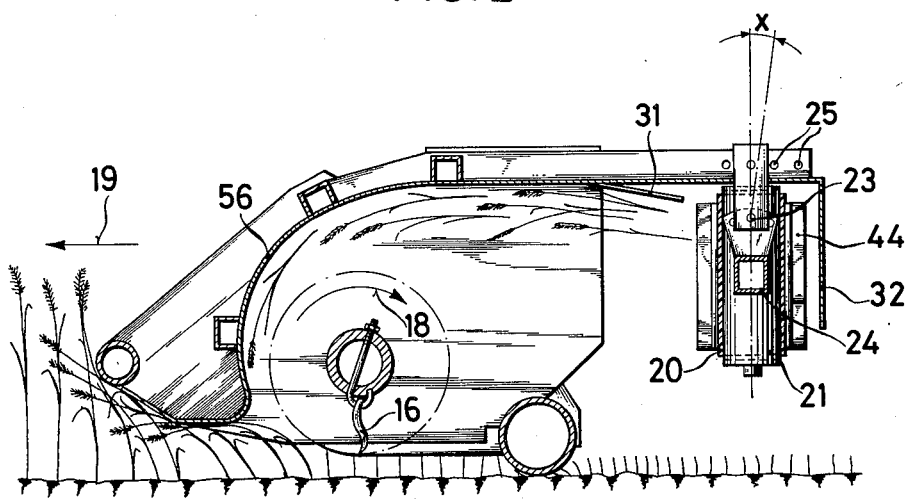
FIG. 2 shows a section along line II—II from FIG. 1.

If the flail shaft or rotor 9 is rotating in the direction of the arrow 18 shown in FIG. 2, a flail knife 16 extends radially outwardly by the centrifugal force, so that their ends describe the cutting circle 17. Thus the crop or grain which is previously deflected forwardly in travel direction 19 by deflector means, is cut by the rotating flails and is moved by the fan effect of the flails via the upper half of the cutting circle 17 and afterwards in a rearwardly directed airstream which is limited by the inner housing 56 of the hood which functions as baffle plate, as shown in FIG. 2. By means of a guiding plate 31 this airstream is slightly directed downwardly.

Transverse conveyor belt 20 of thin, flexible material is located near the exit of the housing 56 and thus within the tossing region of the implements across the full width thereof. This transverse conveyor belt 20 is adjustable in its inclination relative to the ground and is adjustable in its distance to the flail type harvester, functioning as a side delivery device. The conveyor belt is supported by a beam 24 and runs around two end pulleys 21, 22 one of which is driven through a clutch 26 by a hydromotor 27. The grain tossed up to the rear by the implements of the flail type harvester is thrown against the carrying side or front run of the transverse conveyor belt and is conveyed with reference to the rotating direction of the hydromotor 27 either in direction of the arrow 28 in FIG. 1 rearwards of the tractor or in direction of the arrow 29 towards the right side of the flail type harvester, then lying on the ground.

As shown in FIG. 2 the axis of the end pulleys 21, 22 are located vertically but can be angular adjustable at an angle X towards the ground. Additionally the conveyor belt 20 can be arranged within different distances of the flail shaft or rotor 9 by using one of several connecting holes 25 to permit adaption to the stream curve of the rearwardly tossed crop or grain.

Windrowing behind the tractor during rotation of the conveyor belt 20 in the direction of the arrow 28 is supported by a curved deflector plate 30. Behind the conveyor belt 20 a plate 32 bent downwardly is mounted as a device for accident prevention.

Figure 3:
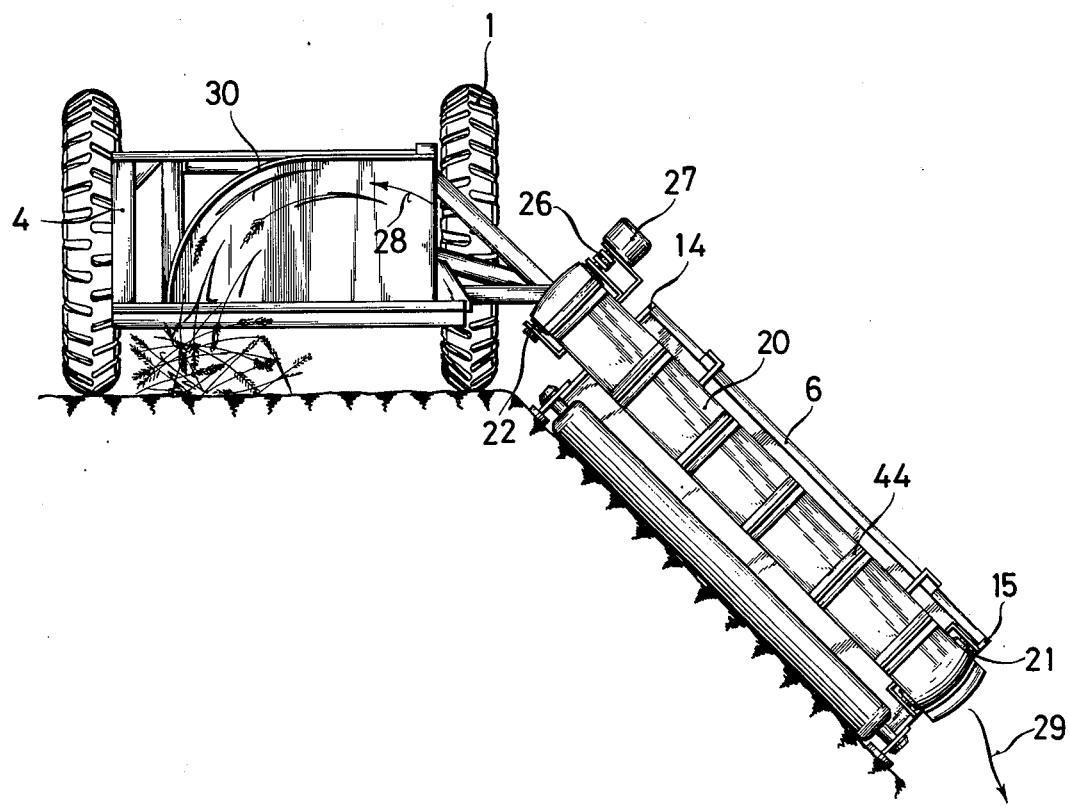
FIG. 3 shows a rear view along line II—III from FIG. 1, the equipment being used as a slope-type mower.

FIG. 3 shows the use of the transverse conveyor belt in conjunction with the mowing of overgrown slopes with a flail type harvester. The cut crop, grain or grass is conveyed over the upper or the lower edge of the slope where it is deposited either behind the tractor or at the bottom side of the slope and where it can be collected on plane grounds.

To improve the pick-up effect of the conveyor belt and to achieve the additionally necessary lifting effect when mowing of overgrown slopes, the adhesive capacity of the belt can be raised by roughening, especially by outward projecting strips, fingers, tines, ribs, bars, combs or similar projections. Thus it is guaranteed that especially windrowing behind the tractor crop or grain cut on steep slopes cannot fall back onto the slope, but is carried on over the top edge of the slope to the level ground beyond and behind the tractor.

Figure 4:
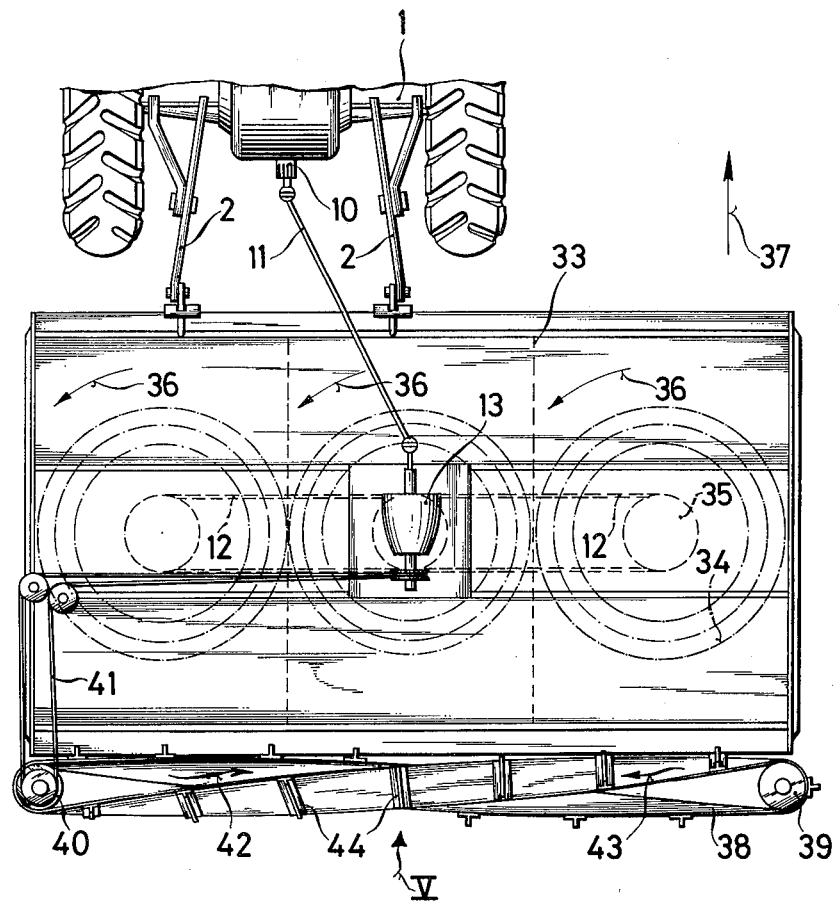
FIG. 4 is a top view of a rotor mower which is operating behind and to one side of the tractor and has a large working width and a transverse conveyor belt situated behind it.

As shown in FIG. 4 the conveyor belt 38 is used behind a rotor mower 33. The knives 34 rotating around vertical shafts 35 in the direction of the arrows 36 describe three touching cutting circles, along said cutting circles with reference to the direction of travel of the machine the crop is cut. The shaft 40 is driven by a belt drive 41 running between the end pulleys 40 or 39 and a gear unit 13.

Figure 5:
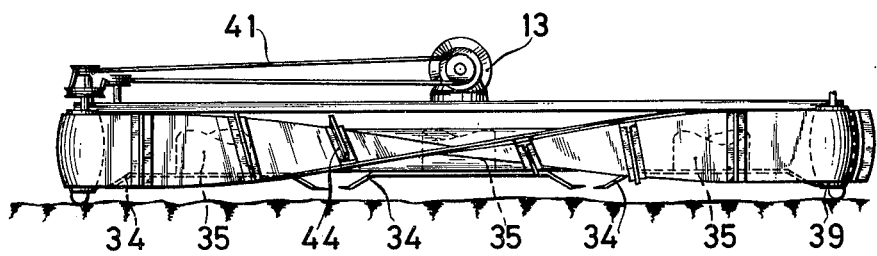
FIG. 5 shows a rear view in the direction of arrow II from FIG. 4.

In the embodiment of the FIGS. 4 and 5 the conveyor belt 38 is running around the end pulleys 39, 40 in a crossed position of 180°. By this arrangement each half of the carrying side or front run of the conveyor belt moves the tossed crop or grain either to the side or to the center. With the direction of rotation shown in FIG. 4 the left half of the conveyor belt conveys the crop in the direction of the arrow 42 to the right side and the right half of the conveyor belt conveys it in the direction of the arrow 43 to the left side, so that the crop is deposited without interference on the ground in the middle of and behind the machine. By reversing the rotary direction of the driven end pulleys 40 the crop is deposited at both ends of the pulleys.

To enable an easier crossing of the belt the peripheries of the end pulleys 39, 40 are slightly spherically shaped.

Figure 6:
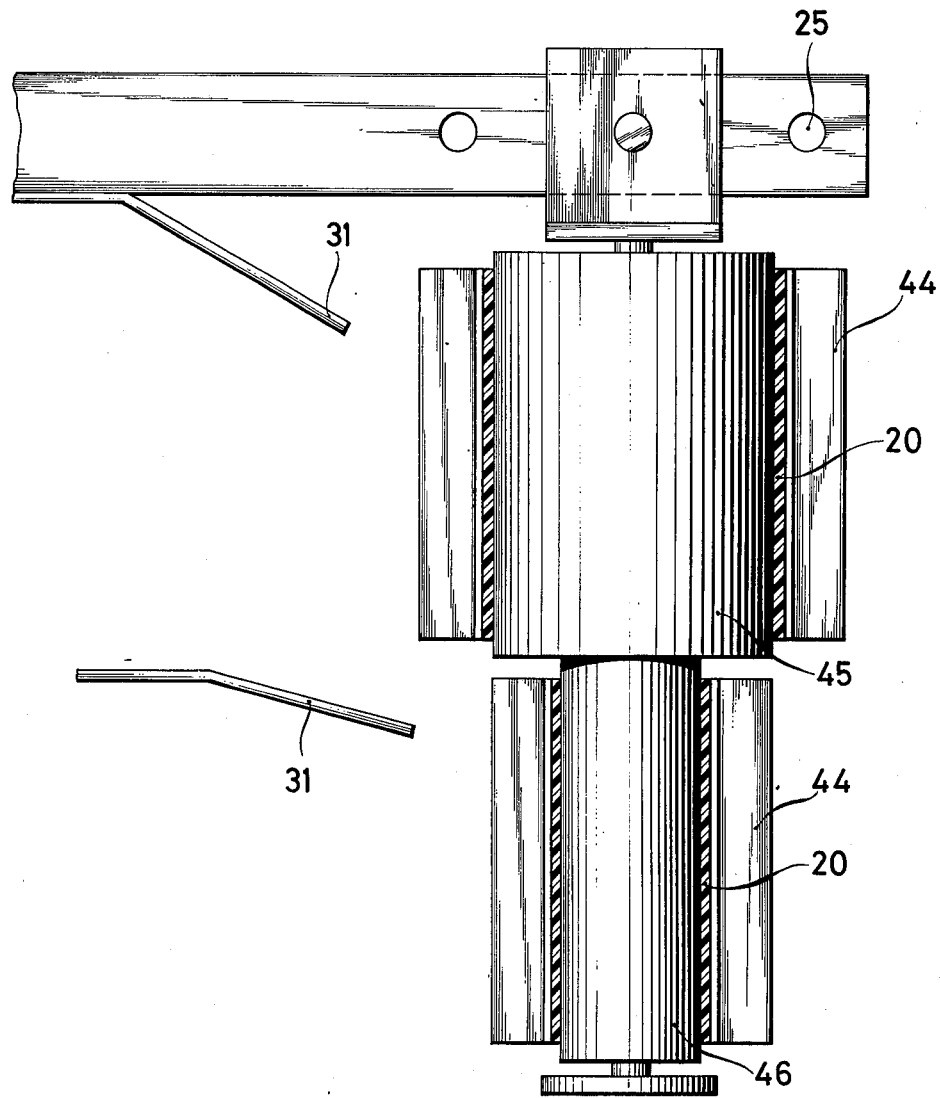
FIG. 6 is a section through a pair of end pulleys for two transverse conveyor belts arranged above one another.

Sometimes it is necessary that the cut crop be scattered broadly so that it can dry more quickly. For this purpose two divided conveyor belts are used in accordance with the embodiment of FIG. 6, each of said belts runs around end pulleys 45, 46 of different diameter, whereas the upper pair of end pulleys 45 has a larger diameter than the lower pair of end pulleys 46, so that the crop or grain is ejected by each of the conveyor belts with throw components of differing magnitude. Each conveyor belt is provided with a coordinated guiding plate 31, 31.

Figure 7:
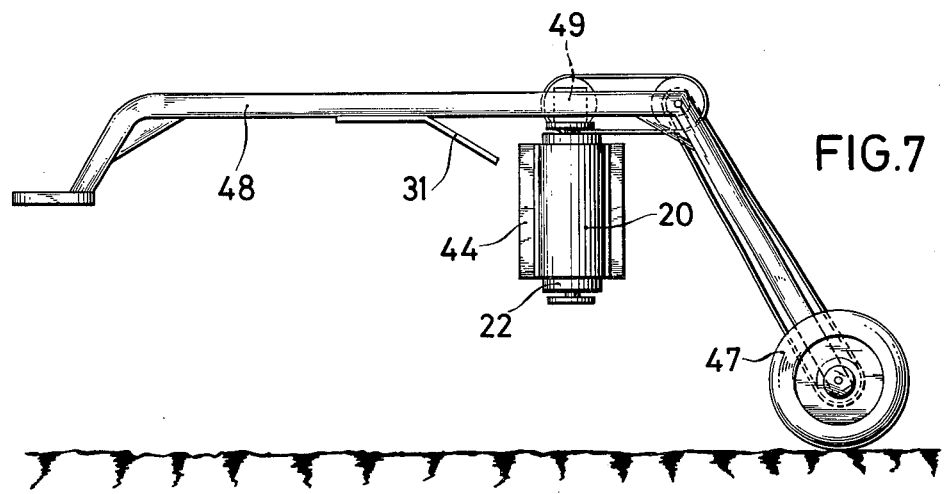
FIG. 7 is a side view of a transverse conveyor belt taking the form of a trailer attachment supported by its own ground wheels.
Figure 8:
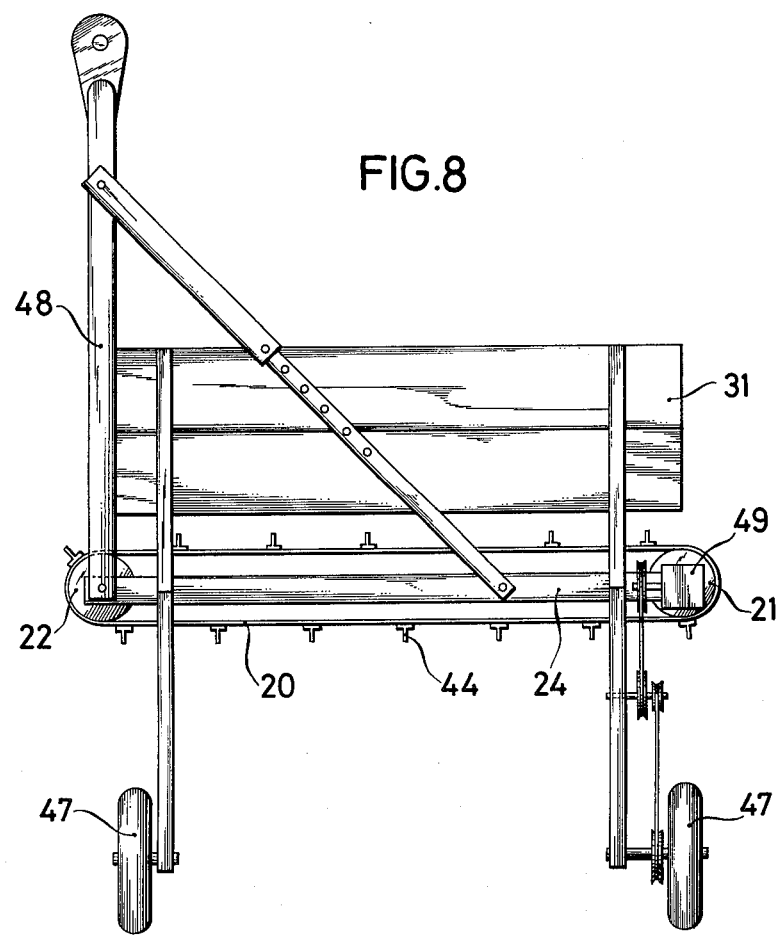
FIG. 8 is a top view of the device according to FIG. 7.

According to the embodiment of FIGS. 7 and 8 the transverse conveyor belt 20 is arranged in a trailer coupled behind a harvester machine of any construction for side delivery of crop, hay, grain or grass directly after cutting, or directly off the ground by means of a laterally arranged deflecting plate. Such a deflecting plate can be arranged similar to the deflecting plate 30 in FIG. 1. It is only necessary for the utilization of such a trailer that the conveyor belt receives the crop or grain having a horizontal throw component. This is normally the case when flail type mowers, rotary mowers and rotary tedders are used. In this type of harvester machines the crop or grain is tossed upwardly and bridges a certain stretch or predetermined distance before it drops on the ground.

The horizontal throw component can be fully utilized when the transverse conveyor belt is connected behind the implements in a suitable distance via a connecting rod 48 to the harvester machine. The trailer is supported by ground wheels 47. The conveyor belt is driven by one of the ground wheels 47 using a gear unit 49 for driving the end pulleys. This drive is independent from the drive of the harvester unit so that it need not be clutched when coupled or decoupled with the harvester unit, and this it is relatively easy to be handled. By reversing the movement of the gear unit 49 a left or right hand delivery of the crop or grain is easily to be achieved. It is also possible to deposit the grain in the center of such a trailer by crossing the belts. It is obvious that the drive for the conveyor belt can be derived from the P.T.O. 1o in order to be independant of the travel speed.

We claim:

1. A device for cutting and effecting side delivery of a crop, such as grass or grain, comprising:
   a frame;
   a cutting means on said frame for cutting said crop and for tossing the cut crop rearwardly of said means with a sufficient throw component whereby said cut crop moves in a path through the air for a predetermined distance;
   a pair of end pulleys supported on said frame behind said implement and spaced apart a distance at least as great as the full width of said path;
   at least one movable conveyor belt supported on said pulleys, said conveyor belt having a portion for receiving and effecting side delivery of said cut crop, said portion spaced rearwardly of said implement by at least said predetermined distance for directly receiving said cut crop and disposed transversely of and being within said path, said portion being disposed in a generally vertical plane;
   and drive means on said frame and connected to at least one of said pulleys for driving said conveyor belt in at least one direction and at a speed sufficient to cause said cut crop tossed against said portion to be retained thereagainst until said cut crop is moved to an end of said conveyor belt and to cause said cut crop to be propelled through the air from said end of said conveyor belt.

2. The device in accordance with claim 1 including means whereby the conveyor belt is adjustable in its horizontal distance to the cutting means and in its angular position from said vertical plane.

3. The device in accordance with claim 1 including a downwardly curved deflecting plate located at a lateral prolongation of said conveyor belt.

4. The device in accordance with claim 1 including means whereby the conveying direction of said conveyor belt is reversible.

5. The device in accordance with claim 1 wherein said cutting means comprises a rotor mower, said conveyor belt being arranged behind said rotor mower.

6. The device in accordance with claim 1 wherein said cutting means comprises a flail type harvester, and a covering hood for said harvester, said conveyor belt being arranged at horizontal distance behind the covering hood of said harvester.

7. The device in accordance with claim 1 including a trailer supported on ground wheels.

8. The device in accordance with claim 1 including a plurality of transverse conveyor belts arranged above one another; a pair of end pulleys for each conveyor belt, each pair of said end pulleys being of different diameter from any other pair; and wherein said drive means is connected to drive at least one pulley in each pair whereby said conveyor belts are driven at different speeds.

9. The device in accordance with claim 8 wherein a plurality of guiding plates are arranged in front of said conveyor belts.

10. The invention device in accordance with claim 1 wherein the outer surface of said conveyor belt is provided with projecting members.

11. The device in accordance with claim 1 wherein said conveyor belt is received by said end pulleys in a crossed position, each half of the belt with its front run conveying in opposite directions.

12. The device in accordance with claim 1 wherein said peripheries of the end pulleys are slightly spherically shaped.

13. In a trailer for coupling behind a machine such as a crop mower or hay mower or the like, to effect side delivery of a crop, such as grass or grain, which is cut by cutting means on said machine and tossed rearwardly of said machine with a sufficient throw component whereby the cut crop moves in a path through the air rearward of said machine for a predetermined distance, comprising:

a frame;

a pair of ground engaging wheels on said frame;

a pair of end pulleys vertically supported on said frame and spaced apart in a direction transverse to said path;

at least one movable conveyor belt supported on said pulleys, said conveyor belt having a portion for receiving and effecting side delivery of said cut crop tossed rearwardly by said machine, said portion being disposed transversely of and being within said path when said trailer is coupled behind said machine, said portion being spaced rearwardly of said cutting means on said machine by at least said predetermined distance for directly receiving said cut crop, said portion being disposed in a generally vertical plane, means for adjustably moving said end pulleys to adjust said portion of said conveyor belt with respect to said vertical plane;

and drive means on said frame and connected to at least one of said pulleys for driving said conveyor belt in at least one direction and at a speed sufficient to cause said cut crop tossed against said portion to be retained thereagainst until said cut crop is moved to an end of said conveyor belt and to cause said cut crop to be propelled through the air from said end of said conveyor belt.

14. The trailer in accordance with claim 13 wherein said conveyor belt is driven by at least one of said ground wheels of said trailer.

15. A trailer in accordance to claim 13 including a plurality of transverse conveyor belts arranged above one another a pair of end pulleys for each conveyor belt, each pair of said end pulleys being of different diameter from any other pair; and wherein said drive means is connected to drive at least one pulley in each pair whereby said conveyor belts are driven at different speeds.

* * * * *